(12) United States Patent
Bishop

(10) Patent No.: US 11,149,710 B2
(45) Date of Patent: Oct. 19, 2021

(54) VERTICAL AXIS WIND TURBINE ROTOR

(71) Applicant: Robert G. Bishop, Glenville, NY (US)

(72) Inventor: Robert G. Bishop, Glenville, NY (US)

( * ) Notice: Subject to any disclaimer, the term of this patent is extended or adjusted under 35 U.S.C. 154(b) by 0 days.

(21) Appl. No.: 15/934,680

(22) Filed: Mar. 23, 2018

(65) Prior Publication Data

US 2019/0293051 A1  Sep. 26, 2019

(51) Int. Cl.
| | | |
|---|---|---|
| *F03D 3/02* | (2006.01) | |
| *F03D 13/10* | (2016.01) | |
| *F03D 3/00* | (2006.01) | |
| *F03D 3/06* | (2006.01) | |

(52) U.S. Cl.
CPC .............. *F03D 3/02* (2013.01); *F03D 3/005* (2013.01); *F03D 3/061* (2013.01); *F03D 3/064* (2013.01); *F03D 13/10* (2016.05)

(58) Field of Classification Search
CPC . F03D 3/02; F03D 13/10; F03D 3/005; F03D 3/061; F03D 3/064
See application file for complete search history.

(56) References Cited

U.S. PATENT DOCUMENTS

| | | | | |
|---|---|---|---|---|
| 4,359,311 A * | 11/1982 | Benesh | ................... | F03D 3/061 |
| | | | | 416/197 A |
| 4,650,403 A * | 3/1987 | Takacs | ................... | F03D 3/065 |
| | | | | 416/196 A |
| D300,932 S * | 5/1989 | Sikes | .............................. | D15/1 |
| 5,333,996 A * | 8/1994 | Bergstein | ................ | F03D 3/061 |
| | | | | 415/3.1 |
| 6,345,957 B1 * | 2/2002 | Szpur | ...................... | F03D 3/065 |
| | | | | 416/197 A |
| 6,666,650 B1 * | 12/2003 | Themel | ................... | B64C 11/48 |
| | | | | 416/200 R |
| 7,215,037 B2 * | 5/2007 | Scalzi | ....................... | B60L 8/00 |
| | | | | 290/55 |
| D587,196 S * | 2/2009 | Chong | ......................... | D13/115 |
| D610,542 S * | 2/2010 | Raisanen | ..................... | D13/115 |
| 7,726,934 B2 * | 6/2010 | Cowan | .................... | F03D 3/005 |
| | | | | 415/4.2 |
| 7,744,345 B1 * | 6/2010 | Pohribnak | ............... | F03D 3/068 |
| | | | | 415/4.2 |
| 7,766,600 B1 * | 8/2010 | Vanderhye | ............. | B63H 13/00 |
| | | | | 415/4.2 |
| 7,798,766 B2 * | 9/2010 | Sauer | ...................... | F03B 13/14 |
| | | | | 415/4.2 |
| 8,358,030 B2 * | 1/2013 | Plaskove | ................... | F03D 3/02 |
| | | | | 290/55 |

(Continued)

OTHER PUBLICATIONS

N.H. Mahmoud, An experimental study on improvement of Savonious rotor performance, Alexandria Engineering Journal, Alexandria University, Aug. 16, 2012, vol. 51, pp. 19-25, Egypt.

*Primary Examiner* — Joseph Ortega
(74) *Attorney, Agent, or Firm* — Lee Palmateer Law Office LLC; Lee Palmateer

(57) ABSTRACT

The present invention is directed to an improved vertical-axis wind turbine rotor that provides a more constant shaft power output than similar turbine rotors of the prior art. In a preferred embodiment, it provides four tiers of blade sets, with each set disposed at a different elevation than each other set. Each blade set may be offset at an angle from adjacent blade sets. A partition plate may be disposed between adjacent blade sets. The partitions provide structural stability and enhanced rotor performance characteristics.

22 Claims, 14 Drawing Sheets

(56) References Cited

U.S. PATENT DOCUMENTS

| | | | |
|---|---|---|---|
| D722,965 S * | 2/2015 | Perless | D13/115 |
| 8,981,585 B2 * | 3/2015 | Soong | F03B 13/10 |
| | | | 290/54 |
| 2006/0108809 A1 * | 5/2006 | Scalzi | B60L 8/00 |
| | | | 290/55 |
| 2006/0275105 A1 * | 12/2006 | Roberts | F03D 3/0409 |
| | | | 415/4.2 |
| 2007/0138797 A1 | 6/2007 | Reidy | |
| 2007/0296219 A1 * | 12/2007 | Nica | F03D 3/0427 |
| | | | 290/55 |
| 2009/0196763 A1 * | 8/2009 | Jones | F03D 3/005 |
| | | | 416/90 R |
| 2010/0013233 A1 * | 1/2010 | Buhtz | F03D 3/00 |
| | | | 290/55 |
| 2010/0109337 A1 * | 5/2010 | Wang | F03D 3/067 |
| | | | 290/55 |
| 2010/0135803 A1 * | 6/2010 | Grewal | F03D 3/02 |
| | | | 416/128 |
| 2011/0135459 A1 * | 6/2011 | Krauss | F03B 17/063 |
| | | | 415/208.1 |
| 2012/0207600 A1 * | 8/2012 | Harris | F03D 3/02 |
| | | | 416/1 |
| 2012/0235418 A1 * | 9/2012 | Plaskove | F03D 9/25 |
| | | | 290/55 |
| 2013/0170949 A1 * | 7/2013 | Samuels | F03D 9/007 |
| | | | 415/1 |
| 2016/0377053 A1 * | 12/2016 | Reyna | F03D 3/005 |
| | | | 415/210.1 |
| 2017/0306925 A1 * | 10/2017 | Rubio | F03D 3/02 |
| 2018/0171970 A1 * | 6/2018 | Chambers | F03D 3/064 |
| 2018/0363624 A1 * | 12/2018 | Focanti | F03D 3/005 |

\* cited by examiner

VERTICAL AXIS WIND TURBINE ROTOR

TECHNICAL FIELD

The present invention relates to a wind turbine rotor.

BACKGROUND OF THE INVENTION

Wind turbines convert wind energy to mechanical power for making electricity and performing other tasks, such as pumping water. Wind turbine rotors typically rotate about an axis. Vertical-axis wind turbines (or VAWTs) have the main rotor shaft arranged vertically. See FIG. 9 showing a VAWT of the prior art. Thus, VAWT shafts are arranged transverse to the direction of the wind flow, which is typically horizontal wind flow. Herein, the "term transverse-axis wind turbine" (or TAWT) may be used interchangeably with VAWT. Descriptions herein are based on a vertically arranged shaft, but it should be understood that the invention may be deployed with the shaft arranged in any direction.

Prior art VAWT's like that shown in FIG. 9 typically comprise a number of aerofoils (also referred to herein as "blades") mounted on a rotating shaft or framework. The wind turns the blades, which spin a shaft connected to an electric generator. Such turbines are simple in structure, have good starting characteristics, relatively low operating speeds, and an ability to capture wind from any direction.

FIG. 9 shows a two-bladed prior art wind turbine rotor comprising a vertical shaft, two overlapping elongated blades, a top end plate at the top of the blades, and a bottom end plate at the bottom of the blades. The blades have a curved shape, such as semicircular shape. The concave side of a blade has greater wind resistance than does the convex side. When placed in a wind flow transverse to the turbine axis, the wind imparts greater force on the concave side than on the convex side. The turbine rotor will rotate about the axis such that the convex sides of the blades are the leading sides.

Over the course of a single rotor revolution, two-bladed vertical axis wind turbines in a steady transverse wind flow experience cyclic wind forces that vary as the position of the blades change relative to the direction of the wind, which results in cyclic shaft torque, cyclic wind forces on individual blades, and cyclic force differentials between the wind force on one blade and the wind force on the other blade. For example, the wind force on a blade is greatest at a moment when the concave side is facing into the wind, and the wind force is greatest in the opposite direction at a moment when the convex side of the blade is facing into the wind. Thus in each turbine revolution, a blade cycles between maximum concave side force to maximum convex side force. In a two blade turbine, where the blades are arranged at 180° from one another, there will be a moment in the revolution when the force differential between the concave side force of one blade and convex side force of the other blade is the greatest and there will be another moment when the force differential will be greatest in the opposite direction. The cyclic forces cause cyclic stresses in the blades and the mechanical components supporting the blades, and the design of the turbine must be adequate to withstand many thousands of cycles over a long period of time.

The cyclic shaft torque causes cyclic shaft power output. Cyclic shaft power output is undesirable. Smooth, or more constant, shaft power output is desirable. Increasing the number of blades on a single tier creates a more constant shaft power output, but reduces the power contribution of each blade because as blades are spaced closer together, each blade's individual exposure to wind flow is reduced due to interference by the trailing adjacent blade.

There is a need for a transverse-axis wind turbine that provides a more constant shaft power output without reducing each blade's exposure to the wind.

The present invention is directed to an improved transverse-axis wind turbine rotor that provides a more constant shaft power output than similar turbine rotors of the prior art. In a preferred embodiment, it provides four tiers of blade sets, with each set disposed at a different elevation than each other set. Each blade set may be offset at an angle from adjacent blade sets. A partition plate may be disposed between adjacent blade sets. Thus blade sets do not block exposure to the wind of other blade sets. Among other things, the partitions provide structural stability, prevent leakage of wind flow around the top and bottom of the blades, and mitigate the formation of vacuum on the concave side of a blade as the convex side of that blade rotates into the wind.

SUMMARY OF THE INVENTION

In a first aspect, the present invention provides a vertical-axis wind turbine rotor comprising: at least one round plate centered on and disposed perpendicularly to the rotor axis; a first blade disposed at a first elevation; a second blade disposed at a second elevation and offset from the first blade a first angle; a third blade disposed at a third elevation and offset from the second blade a second angle; a fourth blade disposed at a fourth elevation and offset from the third blade a third angle; wherein the first blade is offset from the fourth blade at a fourth angle; and wherein the first, second, and third angles are acute angles of the same value.

In a second aspect, the present invention provides a vertical-axis wind turbine stackable rotor module comprising: a partition plate having a first side and second side opposite the first side, said plate configured to receive a shaft; and a turbine blade attached to the first side; wherein the second side is configured to receive a second turbine blade.

In a third aspect, the present invention provides a wind turbine rotor kit, comprising: at least one blade; and at least one end plate unassembled with at least one of the at least one blade, said end plate being configured to receive at least one of the at least one blade.

In a fourth aspect, the present invention provides a vertical-axis wind turbine rotor comprising: three tiers, each tier having three blades equally spaced apart from one another 120°, and each tier offset from the adjacent tiers by 40°.

In a fifth aspect, the present invention provides a method of constructing a wind turbine rotor, comprising: providing a first end plate configured with a through hole for receiving a turbine rotor shaft and with a first groove for receiving a bottom edge of a first blade; providing a first blade; and inserting the bottom edge of the first blade into the groove.

In a sixth aspect, the present invention provides a vertical-axis wind turbine rotor comprising: three blades equally spaced apart at 120°, wherein each blade is disposed at the same axial location relative to the rotor axis and each blade is curved in a semicircular shape.

BRIEF DESCRIPTION OF THE DRAWINGS

The subject matter that is regarded as the invention is particularly pointed out and distinctly claimed in the concluding portion of the specification. The invention, however, may be best understood by reference to the following detailed description of various embodiments and the accompanying drawings in which:

DETAILED DESCRIPTION OF THE INVENTION

FIGS. 1-8 and 11A-11F show preferred embodiments of the vertical-axis wind turbine rotor of the present invention. The description herein describes the preferred embodiments of FIGS. 1-8 and 11A-11F unless otherwise indicated.

Figure 1:
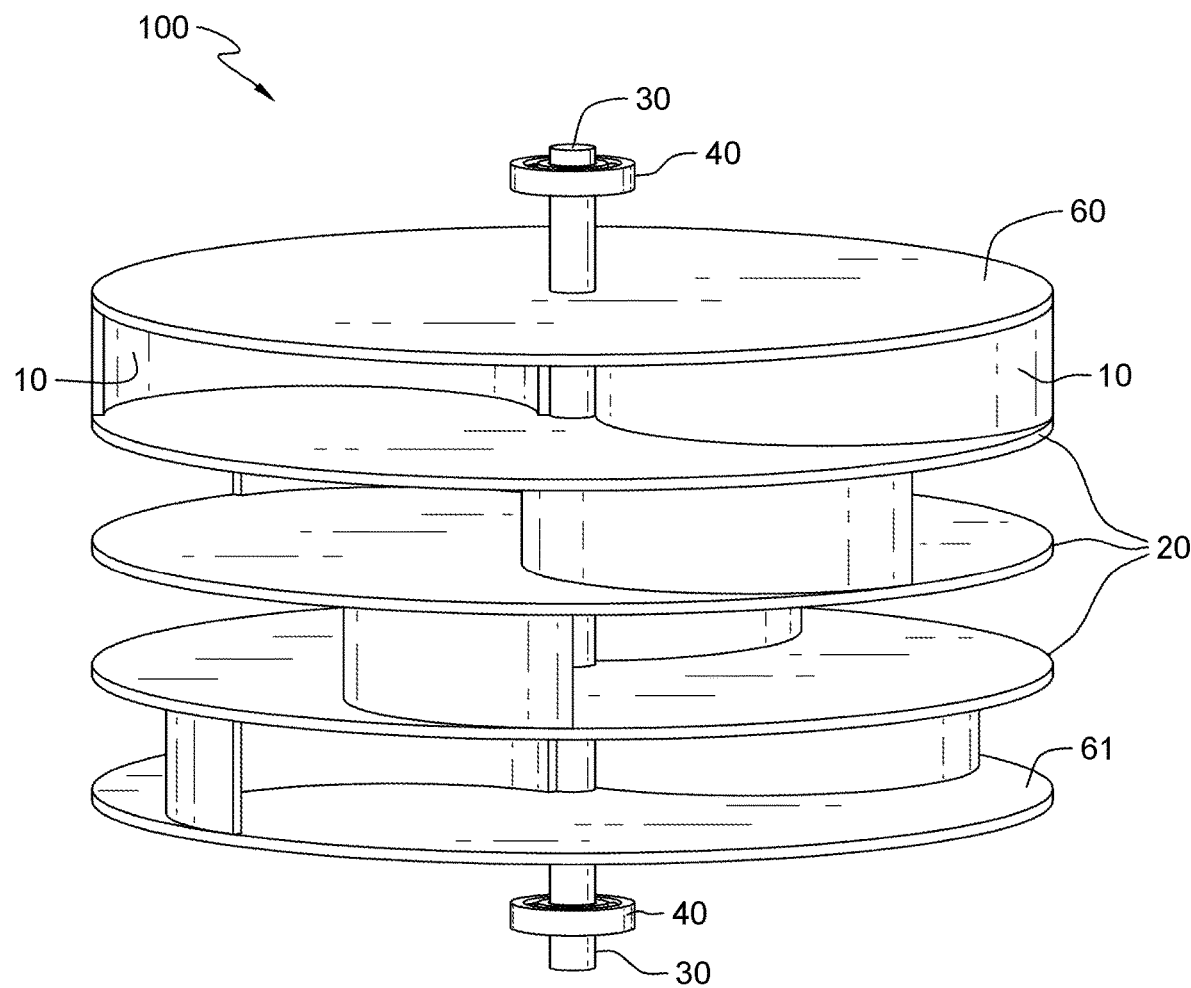
FIG. 1 is a perspective view of one embodiment of a turbine rotor of the present invention.
Figure 2A:
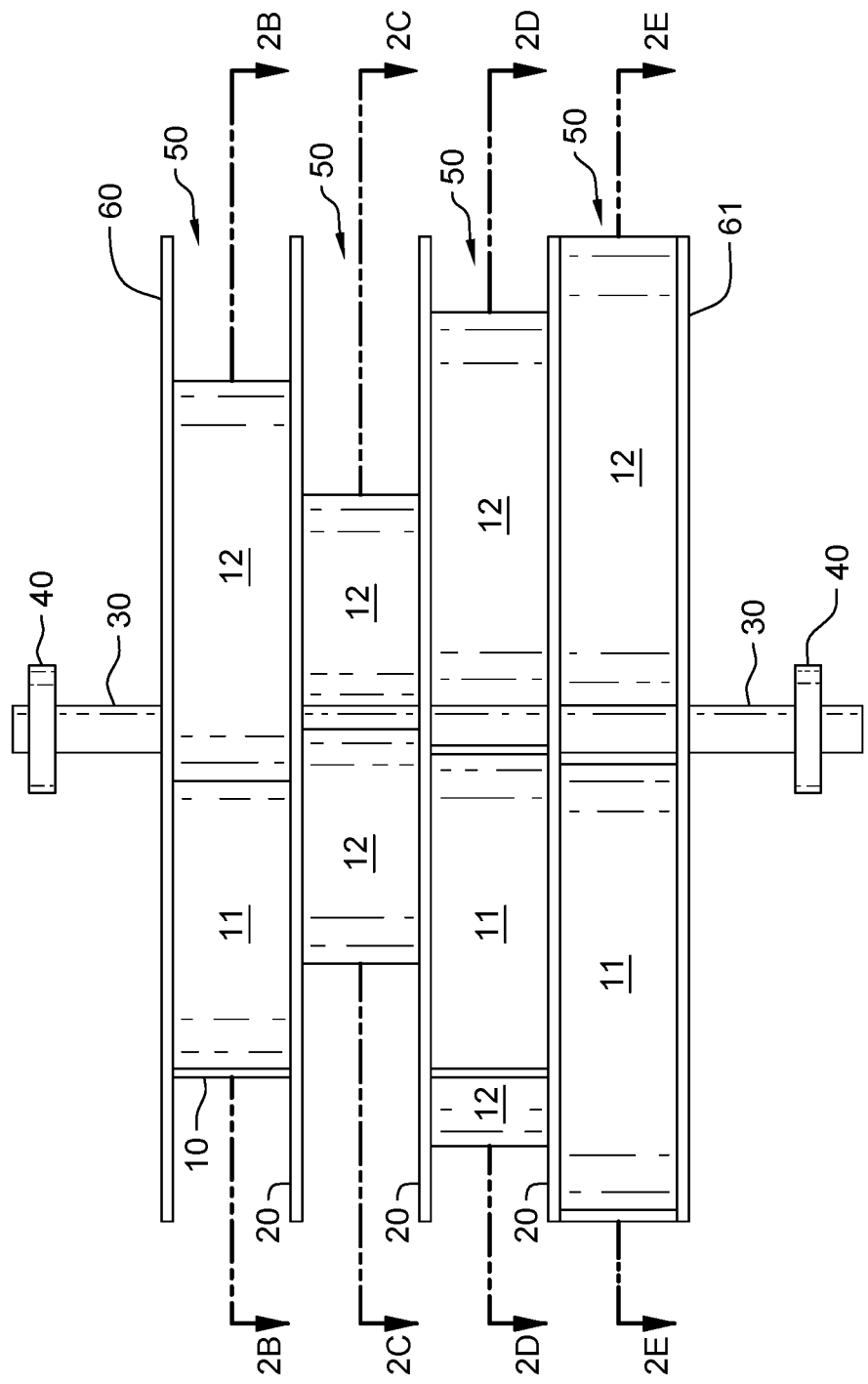
FIG. 2A is a side view of the turbine rotor of FIG. 1.
Figure 2E:
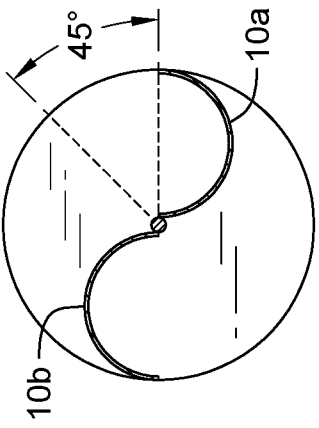
FIG. 2E is a cross sectional view of the turbine rotor of FIG. 1 at section line 2E-2E.
Figure 2D:
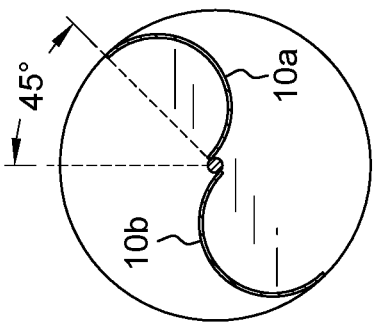
FIG. 2D is a cross sectional view of the turbine rotor of FIG. 1 at section line 2D-2D.
Figure 2C:
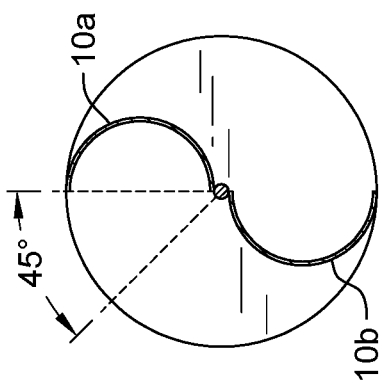
FIG. 2C is a cross sectional view of the turbine rotor of FIG. 1 at section line 2C-2C.
Figure 2B:
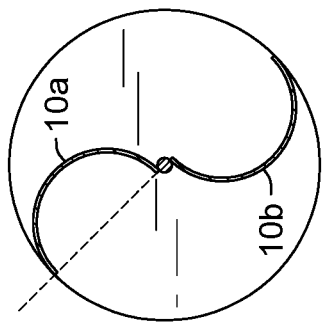
FIG. 2B is a cross sectional view of the turbine rotor of FIG. 1 at section line 2B-2B.
Figure 3:
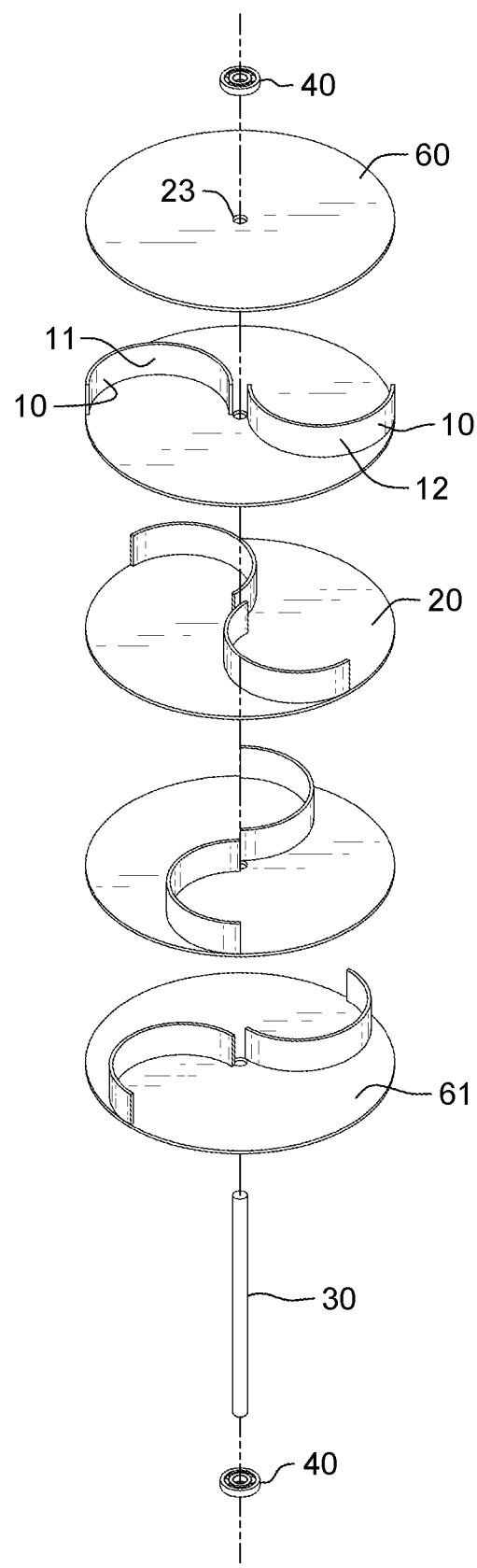
FIG. 3 is an exploded view of the turbine rotor of FIG. 1.

With reference to FIGS. 1 and 2A, in a preferred embodiment, the improved wind turbine rotor comprises blades 10, partition plates 20, end plates 60 and 61, and shaft 30. In the preferred embodiment, blades may be arranged in four tiers, each at a different elevation, and each oriented at an angular offset from adjacent tiers. Each tier may comprise a partition plate, which, among other things, support the blades and partition the tiers from one another.

In the preferred embodiment of four tiers with two blades per tier and each tier offset by 45° from the adjacent triers, there will always be at least three blades receiving wind on their concave faces. This results in greater torque, higher rotor speeds, dramatically increased power, and more constant power to the shaft compared to a single tier, two blade turbine rotor of the same height and equivalent blade surface area. The more constant power to the shaft reduces cyclic loading on the shaft and other turbine rotor components and provides a more favorable power output for applications such as generating electricity. The greater efficiency allows for more production of energy in a smaller sized turbine rotor, which makes it more feasible to mount transverse axis wind turbines in confined spaces and on structures such as utility poles, street light poles, billboards, and homes. The greater efficiency also makes transverse axis wind turbines a better choice for larger turbines for commercial and utility power generation, such as turbines in the 50 to 100 kW range.

With reference to FIG. 3 and FIGS. 2B-2E, each tier may comprise a plurality of blades, which plurality may be referred to herein as a set of blades or as a blade set. Preferably, the blades in each blade set are equally spaced apart. For example, in a preferred embodiment a blade set may comprise two blades spaced apart by 180° as shown FIG. 3 and FIGS. 2B-2E. The angular orientation of each blade set in each tier may be offset from that of the adjacent blade sets. For example, in a preferred embodiment comprising four tiers and two blades per set, each blade set may be offset 45° from the blade sets in the adjacent tiers, as shown in FIG. 3 and FIGS. 2B-2E.

In alternate embodiments, there may be a different number of tiers, such as more than four tiers or less than four tiers; there may be a different number of blades in a tier, such as more than two blades or less than two blades; and blades in a tier may be offset from blades in another tier by a different number of degrees, such as more than 45° or less than 45°. In alternate embodiments, there may be any combination of the foregoing variations in numbers of tiers, numbers of blades in a tier, and angular offset between blades in different tiers. Preferably, the angular offset from tier to tier will be the angle between adjacent blades on a single tier divided by the number of tiers. For example, in a four-tier system, preferably the offset is 45° where each tier has two blades spaced apart 180°; 30° where each tier has three blades spaced apart 120°; 22.5° where each tier has four blades spaced apart 90°; 18° where each tier has five blades spaced apart 72°; and 15° where each tier has six blades spaced apart 60°. For another example, where each tier has two blades spaced apart 180°, preferably the offset is 45° for a four-tier turbine, 36° for a five-tier turbine, and 30° for a six-tier turbine. For another example, where each tier has three blades spaced apart 120°, preferably the offset is 40° for a three-tier turbine. Patterns formed by consecutive tiers may be repeated, for example a pattern of four two-blade tiers having 180° intra-tier blade spacing and 45° inter-tier offset may be repeated, such as a four-tier turbine may be stacked on another four-tier turbine with each having two blades per tier and each having blade sets that are offset by 45° from adjacent blade sets.

For tall turbine rotors that may experience variations in wind flow over the height of the rotor, stacking multiple four-tier turbine rotors on the shaft will mitigate unevenness of torque that may result.

Figure 4:
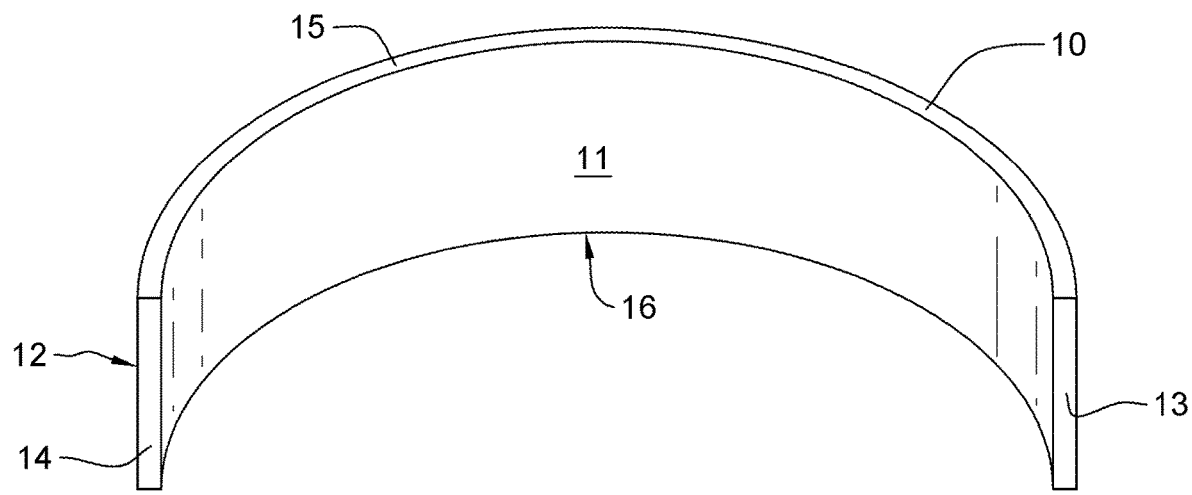
FIG. 4 is a perspective view of a blade of the present invention.

With reference to FIG. 4, blade 10 comprises a concave face 11, convex face 12, interior end 13, exterior end 14, top edge 15 and bottom edge 16. As used herein, the "blade length" is considered to be the straight-line distance from the interior end to the exterior end. For example, in a preferred embodiment, the blades are semicircular in shape and the blade length is the diameter of the semicircle. The blade height is the distance from the bottom edge to the top edge. In a preferred embodiment blade height is less than the blade length. For example, in a preferred embodiment of the present invention, the blade height may be less than three quarters of the blade length; may be less than one half of the blade length; may be less than one third of the blade length; and may be less than one quarter of the blade length.

Blade height limitations may also be expressed in terms relative to the strait line distance from the shaft axis to the exterior end of the blade (also referred to herein as the "blade tip rotor radius"). For example, in a preferred embodiment of the present invention, the blade height may be less than three quarters of the blade tip rotor radius; may be less than one half of the blade tip rotor radius; may be less than one third of the blade tip rotor radius; and may be less than one quarter of the blade tip rotor radius.

Figure 9:
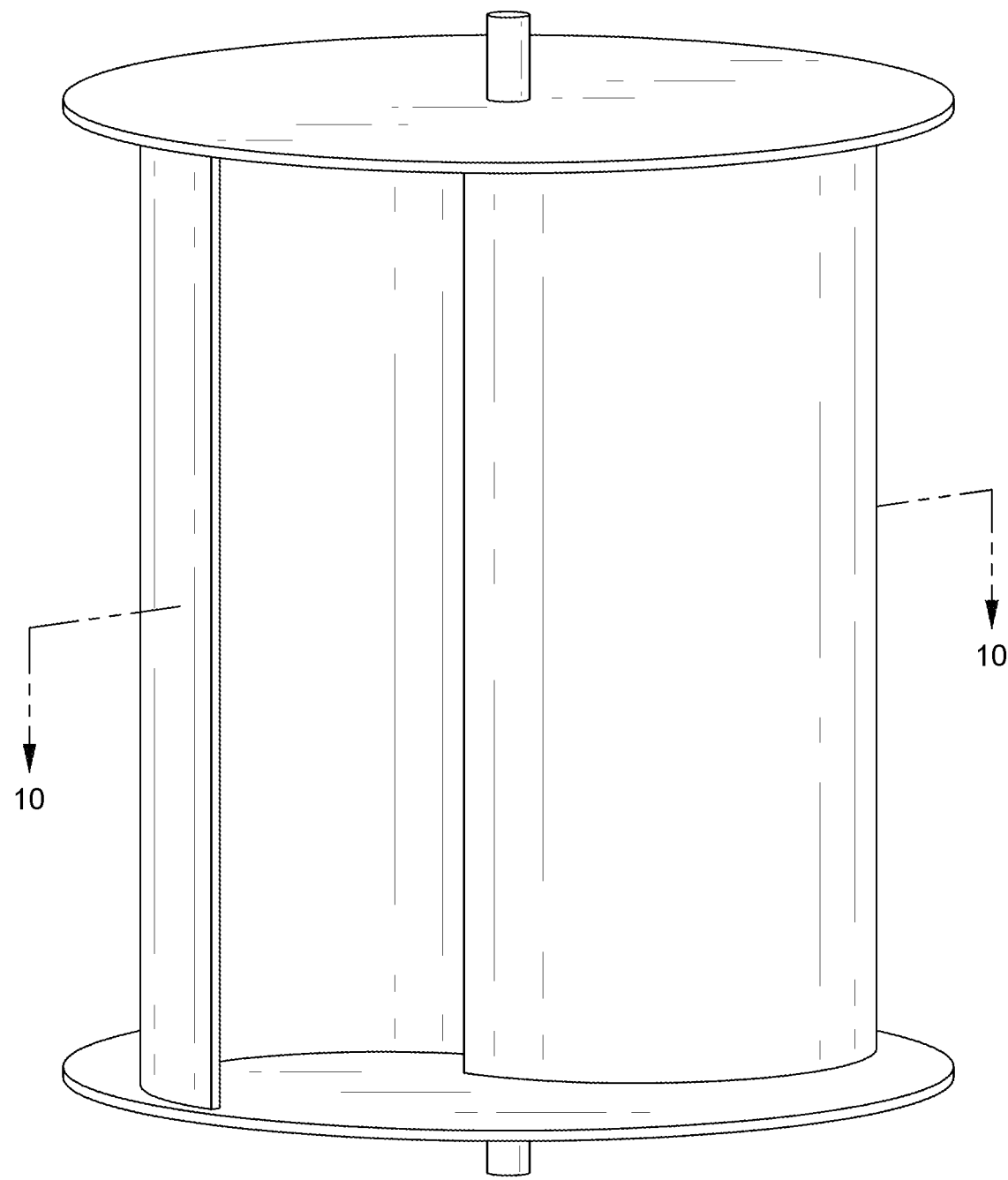
FIG. 9 is a perspective view of a vertical-axis wind turbine rotor of the prior art.

Blade height limitations may also be expressed in terms relative to the "exposed blade length" defined herein as the blade length less the length of any structure of the rotor that overlaps the blade length on the same tier. The amount that a blade is overlapped by an object is the overlap distance measured along the straight line between the blade's interior and exterior ends using dimensioning reference lines that are perpendicular to said line. For example, with reference to the FIG. 9 prior art rotor where the ends of each blade fall on the same line, each blade in FIG. 9 overlaps the other blade and the shaft, and the exposed blade length would be the straight-line distance from the exterior end of one blade to the interior and of the other blade. In a preferred embodiment of the present invention, the blade height may be less than three quarters of the exposed blade length; may be less than one half of the exposed blade length; may be less than one third of the exposed blade length; and may be less than one quarter of the exposed blade length.

In other preferred embodiments, the blade height may be equal to or greater than the blade length. For a given blade length, there is no restriction on the blade height, although in a preferred embodiment, the blades on each tier will have the same length and height as the blades on each other tier.

Shorter blade heights enable a multi-tier turbine rotor of the present invention to fit within the envelope of a single tier of an existing turbine rotor, which typically have much greater blade height. Thus, a multi-tier turbine rotor of the present invention may be used as a replacement rotor for existing systems.

In a preferred embodiment of a replacement rotor of the present invention, the height of each tier in the replacement rotor may be the height of a single tier of an existing rotor divided by the number of tears in the replacement rotor. For example, each tier of a four-tier replacement rotor may be one-quarter (¼) the height of a tier of an existing rotor, and each tier of a three-tier replacement rotor may be one-third (⅓) the height of a tier of an existing rotor.

In a preferred embodiment, the blade "depth" (defined herein for purposes of this disclosure as being the maximum distance from the blade to the line joining the blade ends in a direction perpendicular to the line) may be greater than or equal to one-half (½) the blade length. For example, in a preferred embodiment having blades bent in a semicircular arch, the blade depth may be equal to the radius of the semicircle, which is one-half of the semicircle diameter. Blades meeting the foregoing depth criteria provide better turbine rotor performance than blades with shallower depth.

Figure 10:
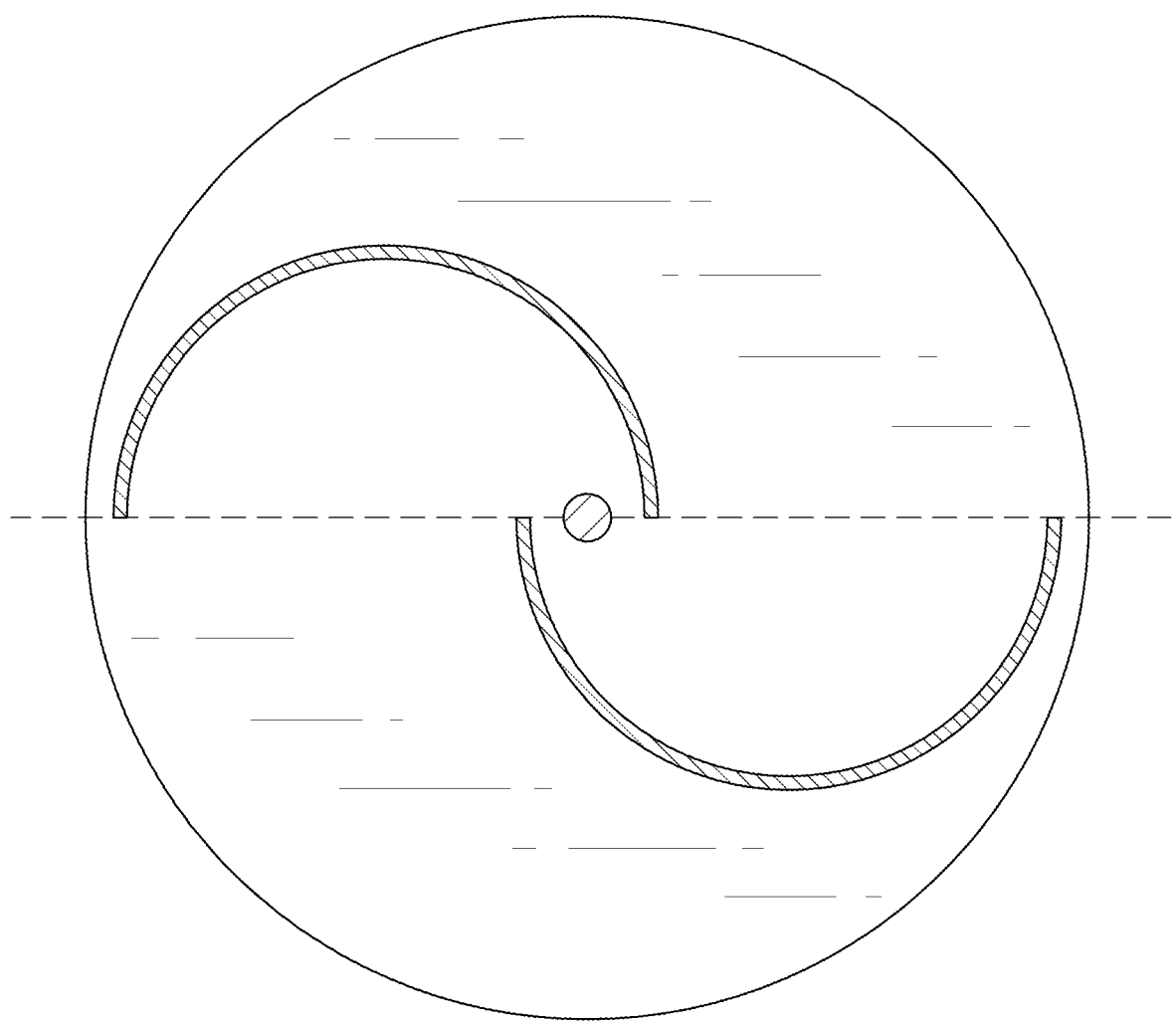
FIG. 10 is a cross-sectional view of FIG. 9 in a horizontal plane along line 10-10, with a horizontal dashed reference line.

With reference to the FIG. 10 prior art rotor, for the purposes of this disclosure, the distance that a first blade is "overlapped" by a second blade is measured along the strait line from end-to-end of the first blade (along the horizontal dashed line in FIG. 10).

In a preferred embodiment of the present invention, interior end 13 (see FIG. 4) of each blade abuts the rotor shaft and does not overlap with interior ends of other blades on the same tier. Thus there is no path for communication of wind current from a concave side of one blade on a tier to a concave side of another blade on the same tier. Such communication would degrade turbine performance, and the absence of such communication results in better performance, i.e., higher torque, speed, power and efficiency. Where each blade abuts the rotor shaft on a two-blade tier, there is a relatively continuous and smooth transition from the concave side of a blade to the convex side of the other blade so that any component of wind flow along the blade surfaces do not have an opportunity to impede turbine rotor performance to the extent that it would impede performance if the transition contained abrupt features.

Figure 11A:
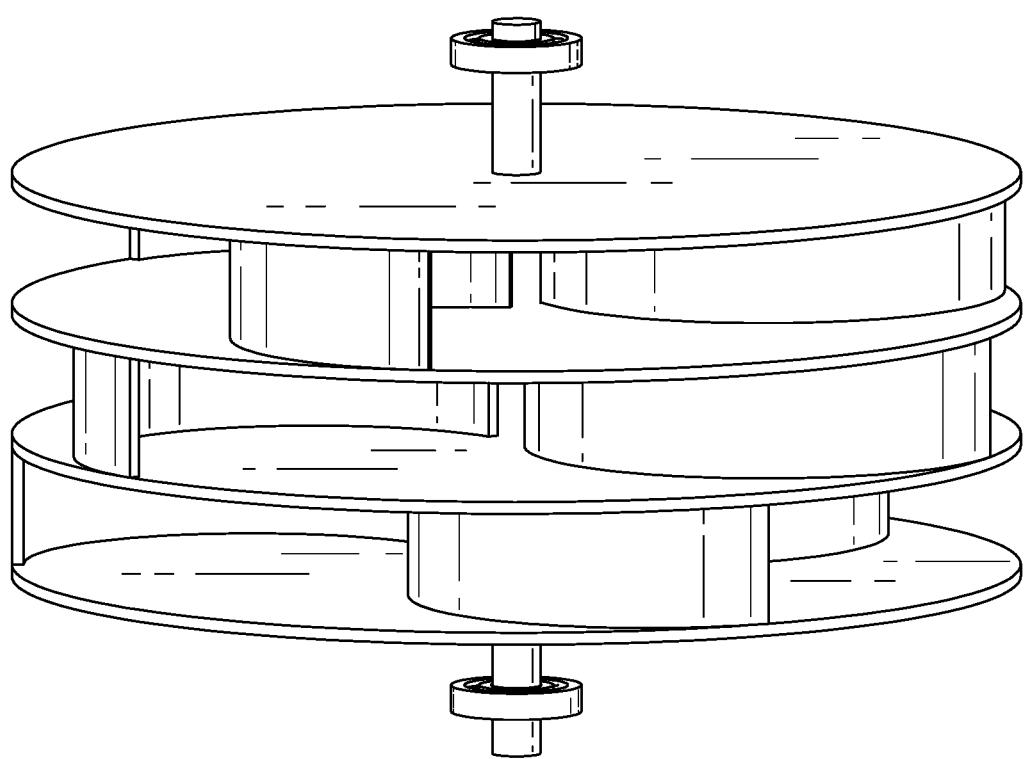
FIG. 11A is a perspective view of an alternate embodiment of a turbine rotor of the present invention.
Figure 11B:
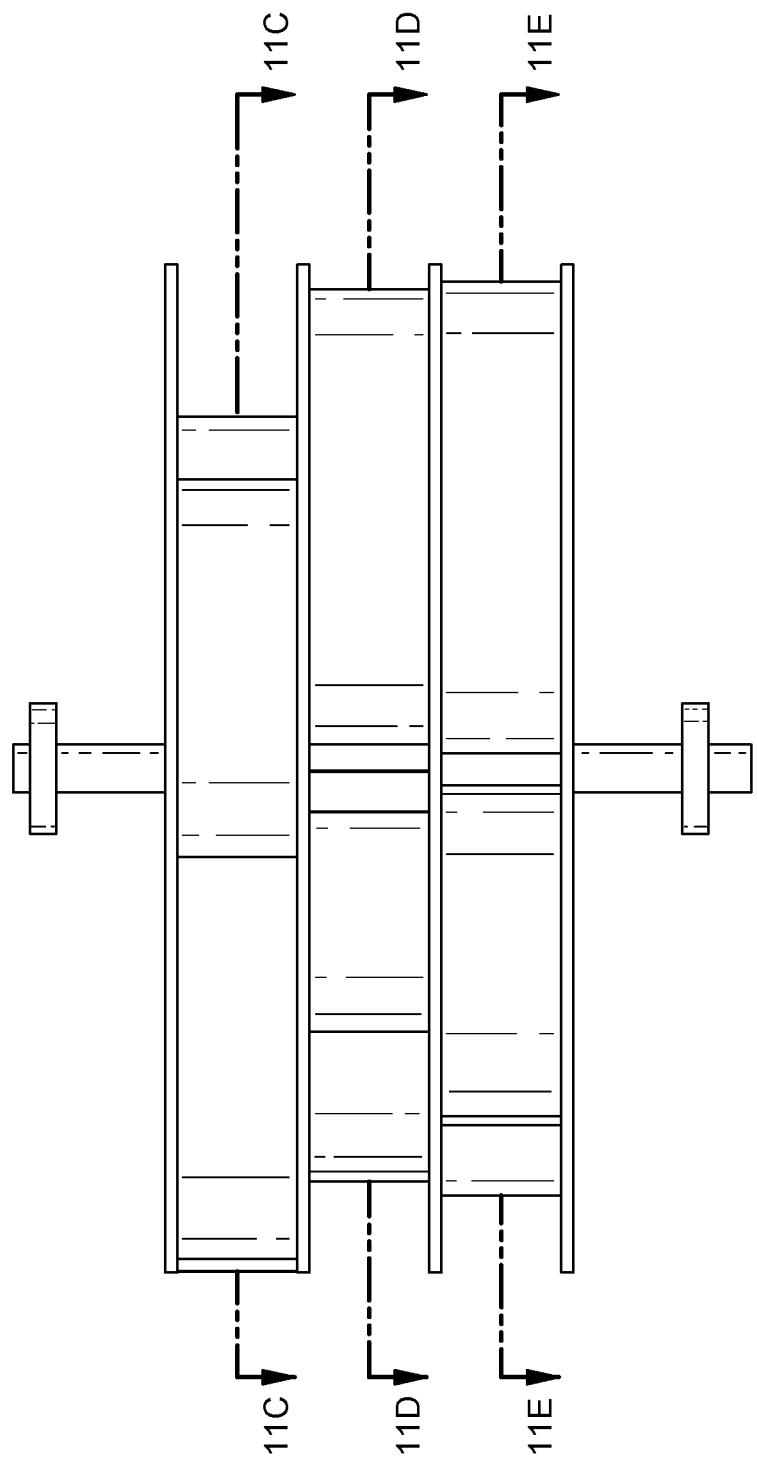
FIG. 11B is a side view of the turbine rotor of FIG. 11A.
Figure 11E:
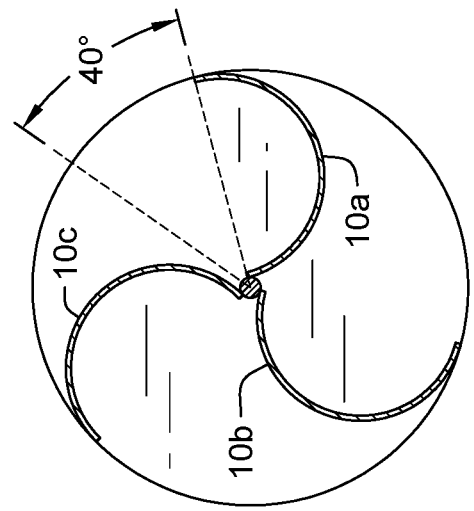
FIG. 11E is a cross sectional view of the rotor of FIG. 11B at section line 11E-11E.
Figure 11D:
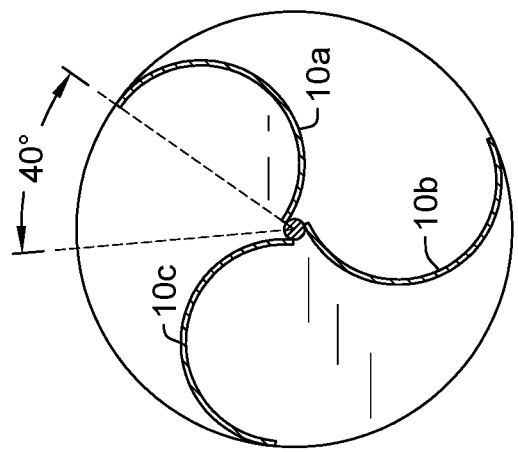
FIG. 11D is a cross sectional view of the rotor of FIG. 11B at section line 11D-11D.
Figure 11C:
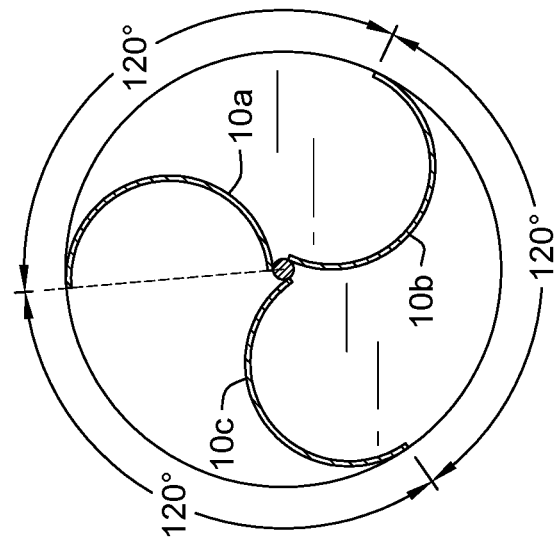
FIG. 11C is a cross sectional view of the rotor of FIG. 11B at section line 11C-11C.
Figure 11F:
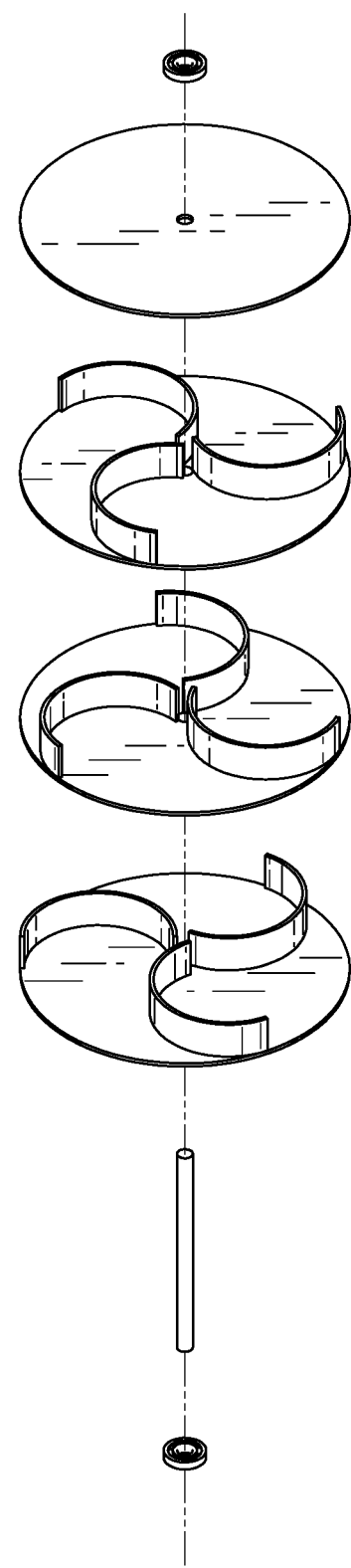
FIG. 11F is an exploded view of the rotor of FIG. 11A.

As used herein, the "spacing" or "angular spacing" between adjacent blades in a set of equally spaced blades on the same tier is considered to be 360° divided by the number of blades. For example, with reference to FIG. 11C, the "spacing" or "angular spacing" between adjacent blades in a set of three blades 10a, 10b, and 10c is 120°. As used herein, the "offset" or "angular offset" of a first blade set from an adjacent blade set on an adjacent tier is considered to be the angular displacement of the first blade set from a position of alignment with the adjacent blade set, as measured in degrees of rotation about the rotor shaft axis. For example, with reference to FIGS. 11C-11E, the "offset" or "angular offset" between blade sets on adjacent tiers in a rotor consisting of three tiers and three blades 10a, 10b, and 10c per tier is 40°. For the three-tier rotor of FIGS. 11A and 11B, the top tier, middle tier and bottom tier are shown in FIGS. 11C-11E, respectively. The blade sets comprise blades of the same size, shape and spacing. FIGS. 11C-11E show the 40° offset dimension between corresponding points on corresponding blades 10a on adjacent tiers. For another example, with reference to FIGS. 2B-2E, the "offset" or "angular offset" between blade sets on adjacent tiers in a rotor consisting of four tiers and two blades 10a and 10b per tier is 45°. For the four-tier rotor of FIGS. 2A and 2B, the top tier, upper-middle tier, lower-middle tier and bottom tier are shown in FIGS. 2B-2E, respectively. The blade sets comprise blades of the same size, shape and spacing. FIGS. 2B-2E show the 45° offset dimension between corresponding points on corresponding blades 10a on adjacent tiers.

With further reference to FIGS. 1 and 2A, in a preferred embodiment, the rotor shaft 30 is connected to rotor components so that it spins with the rotor. For example, the shaft may be connected to one or more of the end plates or partition plates. The rotor shaft may be provided with bearings 40 for rotational connection to an object, such as a frame or other mounting structure. The rotor may be provided with a journal, journal bearings, linear bearings, guides, thrust bearings and/or any other bearing technology suitable for rotating wind turbine shafts. In another embodiment, the rotor shaft may be fixed to an object, such as a frame or other mounting structure, in which case bearings may be provided for rotational connection between the shaft and the remainder of the turbine rotor.

With reference to FIGS. 1-6, in a preferred embodiment, partition plates 20 are round, horizontal plates that have a through hole 23 (see FIG. 5) through the thickness of the plate for receiving a vertical shaft, a top side 21, a bottom side 22, and an outer edge 26. Each partition plate may be connected to at least one blade.

Figure 5:
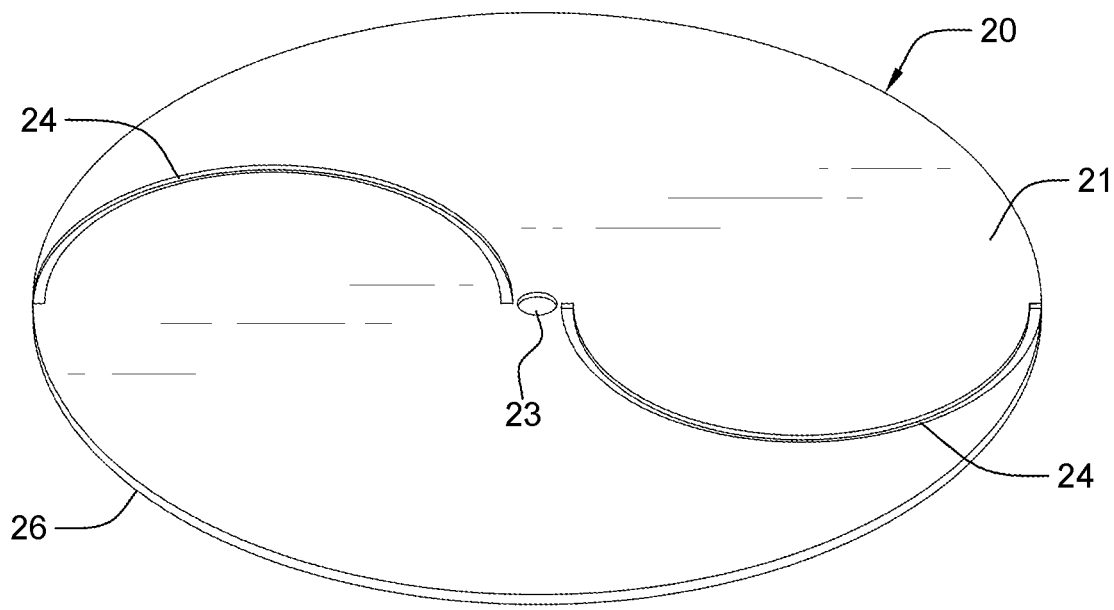
FIG. 5 is a perspective view of a partition plate of the present invention from above.
Figure 8:
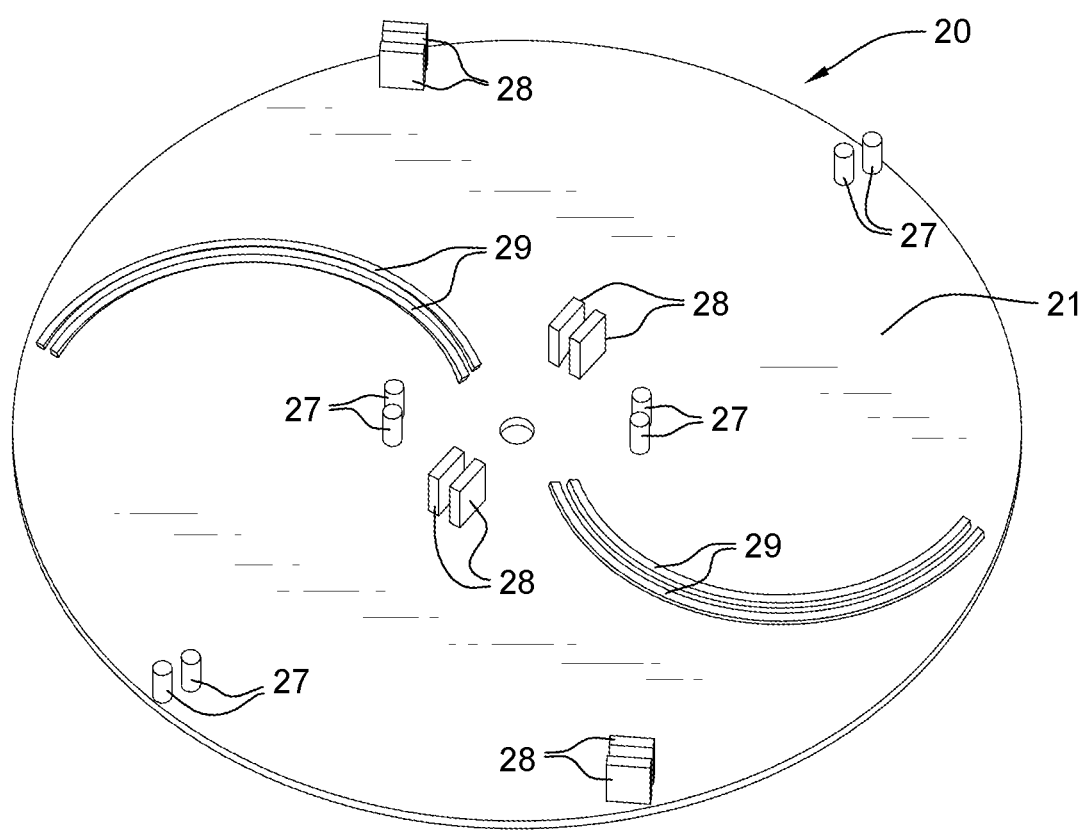
FIG. 8 is a perspective view of another embodiment of a partition plate of the present invention from above.

With further reference to FIG. 5, partition plates may be configured to receive a bottom edge 16 (see FIG. 4) of a blade. The top side of a partition plate may comprise a groove 24 for receiving a bottom edge of a blade. The groove may conform to the shape of the bottom edge so that the edge may be inserted into the groove. Partition plates may be configured to receive or support a blade in a plurality of angular orientations. For example, with reference to FIG. 7, partition plates may comprise a plurality of angularly spaced apart grooves 24. Partition plates may be so configured to receive a range of blade set configurations, such as blade sets with one blade or blade sets with a plurality of angularly spaced apart blades. With reference to FIG. 8, partition plates may comprise upwardly extending protrusions, such as pins 27, tabs 28 or ridges 29 for supporting the blade in position.

Figure 6:
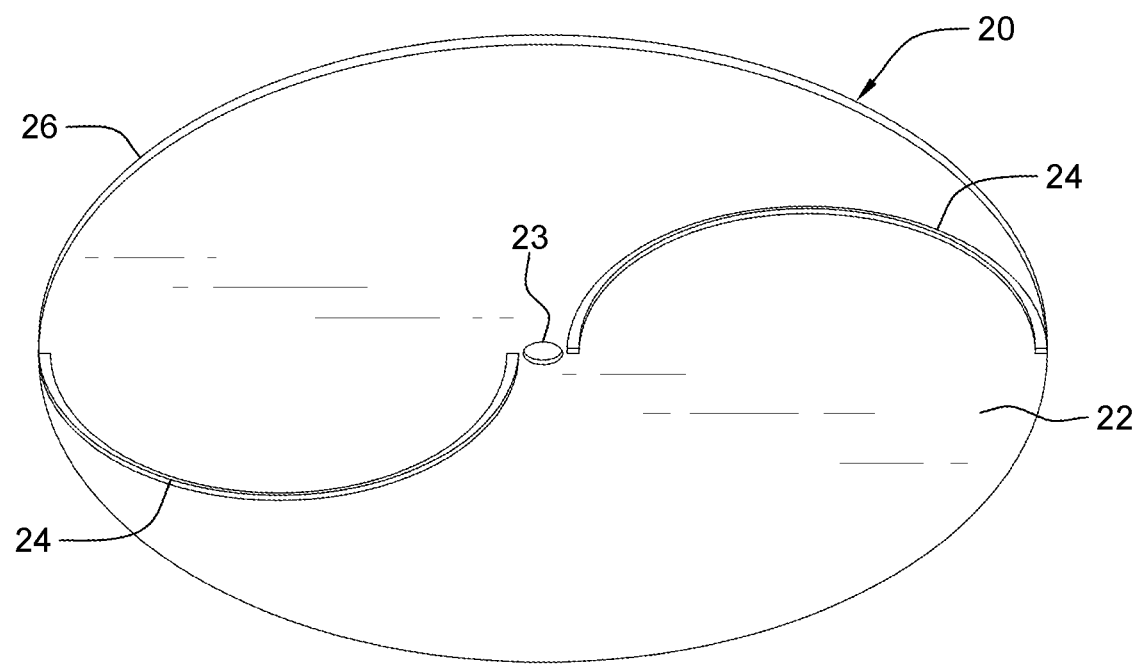
FIG. 6 another perspective view of the partition plate of FIG. 5 from below.
Figure 7:
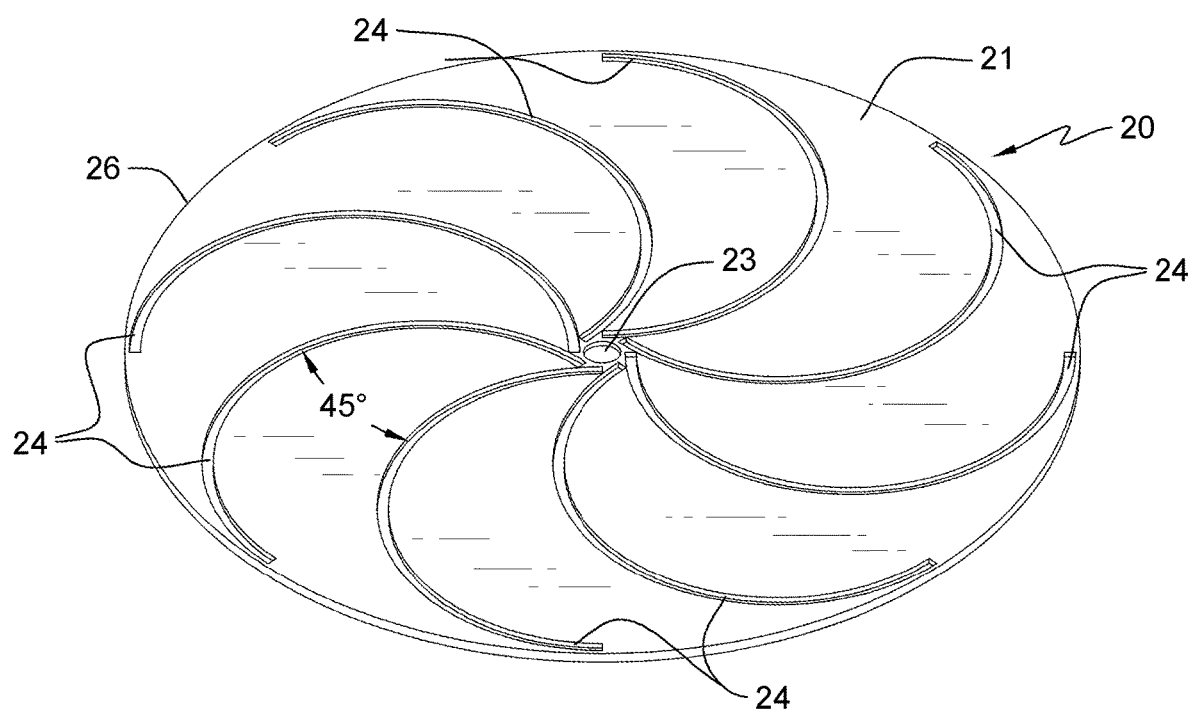
FIG. 7 is a perspective view of another embodiment of a partition plate of the present invention from above.

With further reference to FIG. 6, partition plates may be configured to receive a top edge 15 (see FIG. 4) of a blade. The bottom side of a partition plate may be configured in like manner as the top side, such as for example configured with grooves 24, pins, tabs and/or ridges, but for receiving a top edge of a blade.

Bottom end plates 61 may be configured to receive or support the bottom of blades and top end plates 60 may be configured to receive or support the top of blades with the same means as described above with respect to partition plates.

With further reference to FIG. 2A, the end plates and partition plates form channels 50 between them to channel wind flow horizontally and to prevent leakage of wind flow over or under the top or bottom edges of the blades and prevent loss of power associated with such leakage. Additionally, among other things, the partition and end plates provide structural stability and mitigate the formation of vacuum on the concave side of a blade as the convex side rotates into the wind. Such vacuums reduce rotor torque, power, speed and efficiency, and reduction of such vacuums provides performance improvements. In addition, particularly in embodiments in which blade height is less than the blade length, the partitions provide a beneficial wind-damming effect ahead of the convex side of a blade rotating into the wind, which effect lowers the effective drag of the blade. The end plates and partition plates also reduce rotor wind noise. End plates and partition plates may span the radial space between each blade on a tier, i.e., in the case of a round plate, the radius of the plate is at least as large as the distance from the shaft axis to the exterior end of at least one of the blades on the tier. In a preferred embodiment, end plates and partition plates are round and of sufficient radius to cover the exterior ends of all of the blades on the tier. This provides aerodynamic benefits and improved rotor performance, including those discussed above. In a preferred the embodiment, the perimeter of at least one of the end or partition plates aligns with the end of at least one blade, e.g., the radius of a round plate would equal the distance from the rotor axis to the exterior end of at least one blade, so that the plate does not extend radially outward beyond the end of the blade (i.e., "radially overhang" the blade). Plate radial overhang is preferably avoided so as to avoid the extra associated plate size and mass.

In the preferred embodiment of four tiers with two blades per tier and each tier offset by 45° from the adjacent tiers, there will always be at least three blades receiving wind on their concave faces. This results in greater torque, higher rotor speeds, dramatically increased power, and more constant power to the shaft compared to a single tier, two blade turbine rotor of the same height and equivalent blade surface area. The more constant power to the shaft reduces cyclic loading on the shaft and other turbine rotor components and provides a more favorable power output for applications such as generating electricity. The greater efficiency makes VAWTs more economical and possibly the turbine of choice over a greater range of applications, including, for example, commercial applications, utility power generation in the 50-100 kW (kilowatt) per turbine range, and municipal power projects. The greater efficiency allows for more production of energy in a smaller sized turbine rotor, which makes it more feasible to mount transverse axis wind turbines in confined spaces and on structures such as utility poles, street light poles, billboards, and homes.

Another preferred embodiment of the present invention provides three tiers, each tier having three blades equally spaced apart from one another at 120°, and each tier offset from the adjacent tiers by 40°.

The present invention also provides a kit comprising at least one blade and at least one end plate that is configured to receive at least one blade. The kit may be transported more efficiently than a fully assembled rotor throughout the entire distribution stream and on the final installation site. The kit may be less bulky and take up less room than a fully assembled rotor. Packaging for a kit is less bulky, lighter weight, easier to carry, easier to transport, less expensive to transport, better able to protect the rotor components from damage during transport, easier to produce, and less expensive to produce than packaging for a fully assembled rotor.

A kit may comprise a plurality of blades, a plurality of end plates, and at least one partition plate. A kit may comprise a plurality of partition plates. A kit may comprise a rotor shaft. A kit may also comprise rotor shaft bearings. A kit may comprise any combination of the foregoing components, and may comprise any quantity of any of the foregoing components.

The present invention provides a first method of constructing a wind turbine comprising, in no particular order, providing a first end plate configured with a through hole for receiving a turbine rotor shaft and with a first groove for receiving a bottom edge of a first blade, providing a first blade, and inserting the bottom edge of the first blade into the groove. The first method may further comprise providing a first partition plate configured with a through hole for receiving a turbine rotor shaft and with a second groove for receiving a top edge of the first blade, and inserting the top edge of the first blade into the second groove. Said first partition plate may comprise a third groove for receiving the bottom edge of a second blade, and the first method may further comprise providing a second blade, inserting the bottom edge of the second blade into the third groove, providing a second end plate configured with a through hole for receiving a turbine rotor shaft and with a fourth groove for receiving the top edge of the second blade, and inserting the top edge of the second blade into the fourth groove. The first method may further comprise providing a turbine rotor shaft and inserting the shaft through one or more of the first end plate, first partition plate, and second end plate. The first method may further comprise providing at least one more partition plate configured in a like manner to the first partition plate, providing at least one more blade, and assembling the partition plates and blades into at least one additional rotor tier.

In another embodiment, the present invention provides a second method of constructing a wind turbine in the same manner as the first method, except the end plates and partition plates may be provided with means other than a groove for receiving blades, and the blades may be inserted into said other means. The method steps for all methods herein are in no particular order unless expressly stated or unless necessarily required to practice the method.

Turbine rotors of the present invention have application in air, in other gases, in water and in other liquids. For example, the turbine rotor may be placed in a stream of flowing water which will generate torque and rotation. The turbine rotors generate power in both directions of flow in, for example, tidal currents that change direction with the rising and falling tides.

While the invention has been particularly shown and described with reference to certain embodiments, it will be understood by those skilled in the art that various changes in form and details may be made to the invention without departing from the spirit and scope of the invention as described in the following claims.

I claim:

1. A vertical-axis wind turbine rotor comprising:
   at least one round plate centered on and disposed perpendicularly to the rotor axis;
   said plate configured to receive a shaft disposed on the rotor axis;
   at least one plurality of blade sets, each blade set of said at least one plurality disposed consecutively along the rotor axis at a different elevation than each other blade set in the rotor and each blade set in the at least one plurality consisting of the same number of blades;
   each one of said blade sets in the at least one plurality comprising at least two blades consisting of semicircular blades of the same size and shape arranged symmetrically about the rotor axis so that each blade in a blade set has the same angular spacing from each adjacent blade in the same blade set;
   each blade set in the at least one plurality offset from at least one other blade set in the same at least one plurality by a fixed acute angle having a value determined by dividing the value of said angular spacing by the number of blade sets in the same at least one plurality;
   every plurality of blade sets in the rotor comprising
      a first blade set disposed at a first elevation and comprising blades disposed to abut against a shaft coaxial with the rotor axis;
      a second blade set disposed at a second elevation and offset from the first blade set a first angle;
      a third blade set disposed at a third elevation and offset from the second blade set a second angle;
      a fourth blade set disposed at a fourth elevation and offset from the third blade set a third angle;
   wherein the first, second, and third angles are acute angles of the same value; and
   wherein all of the blade sets in the rotor have fixed relation to one another as the rotor rotates around the rotor axis in operation.

2. The wind turbine rotor of claim 1, wherein:
   at least one of the blades has a height that is less than the radial distance from the rotor axis to the outer end of the blade.

3. The wind turbine rotor of claim 1, wherein:
   at least one of the blades has a height that is less than one-half of the radial distance from the rotor axis to the outer end of the blade.

4. The wind turbine rotor of claim 1, wherein:
   at least one of the blades has a height that is less than one-quarter of the radial distance from the rotor axis to the outer end of the blade.

5. The wind turbine rotor of claim 1, wherein the at least one round plate comprises:
   at least one horizontal partition between one of the blades and another one of the blades.

6. The wind turbine rotor of claim 1, wherein the at least one round plate comprises:
   a first horizontal partition disposed between the first and second blades, a second horizontal partition disposed between the second and third blades, a third horizontal partition disposed between the third and fourth blades.

7. The wind turbine rotor of claim 1, wherein the at least one round plate comprises:
   a horizontal partition disposed between each vertically adjacent blade set.

8. The wind turbine rotor of claim 1, further comprising:
   a shaft having an axis centered on the rotor axis around which shaft axis the rotor rotates in response to horizontal wind current.

9. The wind turbine rotor of claim 8 wherein the shaft is attached to and rotates with the rotor.

10. The wind turbine rotor of claim 8 wherein the shaft abuts against at least one of said first, second, third and fourth blades and is attached to said at least one of said blades where it abuts against said at least one of said blades.

11. A vertical-axis wind turbine stackable rotor module comprising:
    a partition plate having a first side and second side opposite the first side, said plate configured to receive a shaft on the rotor module axis; and
    a semicircular turbine blade attached to the first side and disposed to abut against a shaft on the rotor module axis;
    wherein the second side comprises a groove for receiving a second turbine blade.

12. The stackable module of claim 11 wherein:
    the second side is configured so that the second blade may be received at a range of angular orientations.

13. The stackable module of claim 11 wherein:
    the second side comprises a groove for receiving a second turbine blade.

14. The stackable module of claim 11 wherein:
    the second side comprises at least three angularly spaced apart grooves configured to receive a blade.

15. A vertical-axis wind turbine stackable rotor module comprising:
    a partition plate having a first side and second side opposite the first side, said plate configured to receive a shaft; and
    a turbine blade attached to the first side;
    wherein the second side comprises a plurality of spaced apart protrusions forming a support for receiving a second turbine blade.

16. The stackable module of claim 15 wherein:
    the plurality of spaced apart protrusions comprises multiple sets of spaced apart protrusions, each set of protrusions forming a support for receiving a second turbine blade, and each set of protrusions spaced apart angularly from each other set.

17. A wind turbine rotor kit, comprising:
    at least one blade; and
    at least one end plate unassembled with at least one of the at least one blade, said end plate comprising a blade support for receiving at least one of the at least one blade;
    said blade support selected from the group consisting of grooves and protrusions.

18. The wind turbine rotor kit of claim 17, further comprising:
    at least one partition plate comprising a blade support for receiving at least one of the at least one blade;
    said blade support selected from the group consisting of grooves and protrusions.

19. A vertical-axis wind turbine rotor comprising:
three tiers of blades, each tier comprising a blade set consisting of three semicircular blades equally spaced apart from one another 120°, each of said three blades having the same size and shape;
and the blade set of each tier arranged symmetrically about a rotor axis and offset from the blade set of the adjacent tiers by a fixed 40° rotation about the rotor axis;
wherein each of said blade sets have fixed relation to each of the other said blade sets as the rotor rotates around the rotor axis in operation;
said rotor configured to receive a shaft on the rotor axis; and
at least one of said blades on each tier disposed to abut against a shaft on the rotor axis.

20. A method of constructing a wind turbine rotor, comprising the steps of:
providing a first end plate comprising a through hole for receiving a turbine rotor shaft and a first groove for receiving a bottom edge of a first blade;
providing a first semicircular blade;
inserting the bottom edge of the first semicircular blade into the first groove; and
disposing the first semicircular blade to abut against a turbine rotor shaft in the through hole.

21. The method of claim 20, further comprising:
providing a first partition plate comprising a through hole for receiving a turbine rotor shaft, two sides, a second groove on one side for receiving a top edge of the first semicircular blade and a third groove on another side offset an acute angle from the second groove for receiving a bottom edge of a second semicircular blade;
inserting the top edge of the first blade into the second groove;
providing a second semicircular blade;
inserting the bottom edge of the second semicircular blade into the third groove;
providing a second partition plate comprising two sides, a through hole for receiving a turbine rotor shaft, a fourth groove on one side for receiving a top edge of the second semicircular blade and a fifth groove on another side for receiving a bottom edge of a third semicircular blade;
inserting the top edge of the second blade into the fourth groove;
providing a third semicircular blade; and
inserting the bottom edge of the third semicircular blade into the fifth groove.

22. A vertical-axis wind turbine rotor comprising:
a shaft disposed coaxially with a rotor axis, three blades abutting against the shaft and equally spaced apart at 120°, wherein each blade is disposed at the same axial location relative to the rotor axis and each blade is curved in a semicircular shape.

\* \* \* \* \*